(12) United States Patent
Trier et al.

(10) Patent No.: US 10,289,629 B1
(45) Date of Patent: May 14, 2019

(54) TECHNIQUES FOR INTERRUPTION-FREE PARTITIONING

(71) Applicant: Amazon Technologies, Inc., Reno, NV (US)

(72) Inventors: Stephen Christopher Trier, Bothell, WA (US); Xuan Wu, Seattle, WA (US); Chao Song, Seattle, WA (US); Guoqiang Duan, Renton, WA (US); Aaron Joseph Coon, Bellevue, WA (US); Brian Lee Blackmore, Seattle, WA (US); William Lundberg, Oakland, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 185 days.

(21) Appl. No.: 15/189,915

(22) Filed: Jun. 22, 2016

(51) Int. Cl.
| G06F 15/177 | (2006.01) |
| G06F 16/25 | (2019.01) |
| G06F 17/30 | (2006.01) |
| H04L 12/24 | (2006.01) |
| G06F 16/22 | (2019.01) |

(52) U.S. Cl.
CPC ............ G06F 16/258 (2019.01); G06F 16/22 (2019.01); G06F 17/30312 (2013.01); G06F 17/30569 (2013.01); H04L 41/0813 (2013.01)

(58) Field of Classification Search
USPC ......................................................... 709/220
See application file for complete search history.

Primary Examiner — Hee Soo Kim
(74) Attorney, Agent, or Firm — Hogan Lovells US, LLP

(57) ABSTRACT

A migration management service can partition a service and migrate resource data without requiring the resource to be taken offline. The migration management service can receive a request to partition a service into multiple partitioned services that are independent of one another. The request can identify one or more resources associated with each partition. For example, a single service receiving data for resources throughout the world can be divided into multiple regional services, where each regional service is independent of the others. The migration management service can track the status of data while migrating. As new messages are received from resources, the migration management service can determine the migration status of the resources. If the data for a resource is not migrated, the original data store can be used. However, if the data is migrated, the message can be forwarded to the appropriate partition for further processing.

20 Claims, 6 Drawing Sheets

TECHNIQUES FOR INTERRUPTION-FREE PARTITIONING

Distributed computing systems, such as cloud computing systems, make various services available to users without requiring those users to setup or maintain their own infrastructure. This leads providers of such services to maintain extensive data centers, including servers and other computing devices. These data centers may be supported by global services that monitor the usage and health of these data centers and computing devices. Conventional techniques for maintaining these global services require the associated data center or computing device to be taken offline to avoid data loss. Similarly, if a global service goes down, the associated data center or computing device may need to be taken offline to avoid data loss until the global service, or a substitute service, can be restored.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for interruption-free partitioning in an electronic environment. In particular, various embodiments provide a migration management system which can divide a service into multiple independent partitions and migrate resource data without requiring the resource to be taken offline.

In some embodiments, a migration management service can partition a service and migrate resource data without requiring the resource to be taken offline. The migration management service can receive a request to partition a service into multiple partitioned services that are independent of one another. The request can identify one or more resources associated with each partition. For example, a single service receiving data for resources throughout the world can be divided into multiple regional services, where each regional service is independent of the others. The migration management service can track the status of data while migrating. As new messages are received from resources, the migration management service can determine the migration status of the resources. If the data for a resource is not migrated, the original data store can be used. However, if the data is migrated, the message can be forwarded to the appropriate partition for further processing.

By making each partitioned service independent, the effects of a failure to one partition can be isolated to only those resources associated with that partition, reducing the losses that could occur as a result of the failure. Additionally, such partitioning enables the service to be scaled more efficiently by splitting it into shards. If the data for a shard is independent of the data for the other shards, dividing the service into multiple parallel shards allows it to scale linearly, or near-linearly, with the number of shards.

Various other functions can be implemented within the various embodiments as well as discussed and suggested elsewhere herein.

Figure 1:
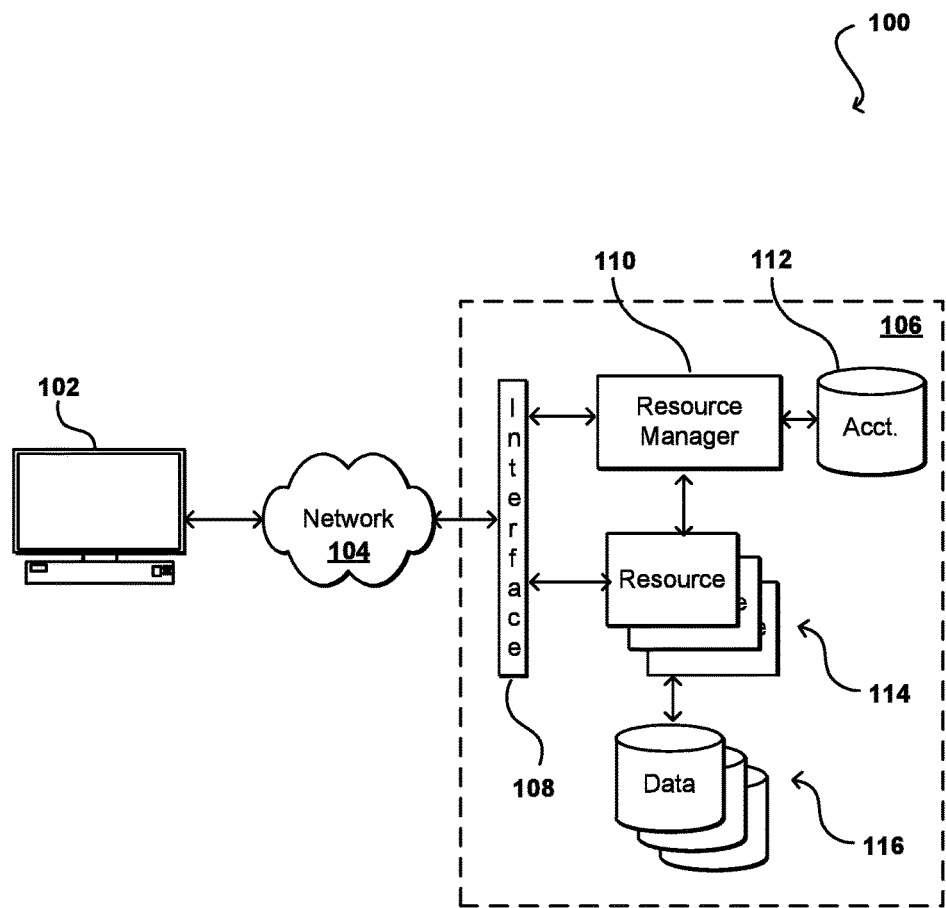
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager, authorization manager 110, or other such system, service, or component configured to manage user accounts and information. A component such as a resource manager can also handle tasks such as resource provisioning and usage, and other such aspects. An authorization manager 110 receiving information for the request can perform tasks such as to authenticate an identity of the user submitting the request, as well as to determine whether that user has an existing account with the resource provider, where the account data may be stored in at least one account data store 112 or other such repository in the provider environment. A user can provide any of various types of credentials in order to authenticate an identity of the user to the provider. These credentials can include, for example, a username and password pair, biometric data, a digital signature, or other such information. The provider can validate this information against information stored for the user in the account data store 112. If the user has an account with the appropriate permissions, status, etc., information can be passed to the resource manager, which can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager, at least until such time as a relevant aspect of the user account changes, the user is no longer granted access to the resource, or another such aspect changes.

The resource manager (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2:
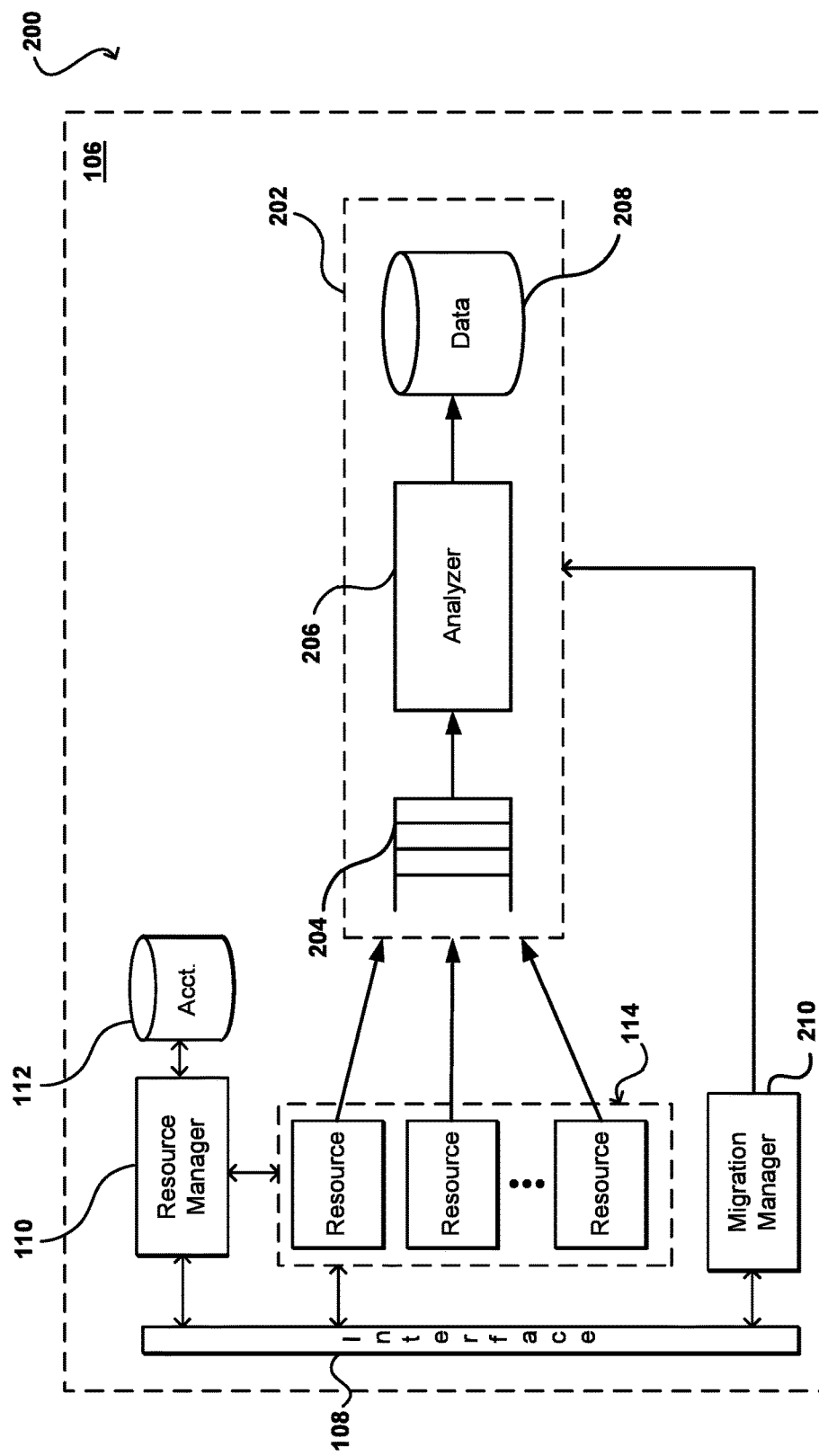
FIG. 2 illustrates an example environment where a migration manager can enable partitioning of services and data migration, in accordance with various embodiments.

FIG. 2 illustrates an example environment 200 where a migration manager can enable partitioning of services and data migration, in accordance with various embodiments. As shown in FIG. 2, a service 202 can receive data from resources 114. For example, service 202 can be a resource monitoring service that receives log data (e.g., usage, utilization, telemetry, or other data) from the resources. In various embodiments, each resource may include an application server, database server, web server, or other server, or may represent groups of resources, such as a data center including a plurality of servers. Although the embodiment shown in FIG. 2 shows service 202 as part of resource provider environment 106, in various embodiments, service 202 may be implemented in one or more separate environments and communicate with each resource 114 over any appropriate network, including an intranet, the Internet, a cellular network, a local area network (LAN), or any other such wired or wireless network.

As shown in FIG. 2, multiple resources (e.g., hosts, computers, devices, servers, etc.) can send messages to service 202. The messages may include log data, such as usage, utilization, telemetry, or other data associated with the resource, or may include any other data received from a resource. In some embodiments, service 202 may represent a back end service that receives messages from resources provisioned by resource provider environment 106. In some embodiments, service 202 may represent a global back end service receiving messages from all resources in a global deployment, with messages received over various network connections, such as the Internet, a corporate network, or other appropriate network. As messages are received, the messages can be placed in queue 204. Queue 204 can include a queue service and/or may be implemented as part of analyzer 206. In some embodiments, queue 204 may represent the propagation delay between the resources and service 202. Messages can be retrieved from queue 204 and processed by analyzer 206. Analyzer 206 can obtain data from the message and store the data in data store 208.

As discussed above, a centralized service, such as service 202, can impact all resources in the event of a failure. Additionally, a centralized service can be more difficult to scale as more resources are brought online. As such, a migration manager 210 can be configured to partition service 202 into multiple partitioned services, each associated with a different subset of resources 114. For example, as discussed further below with respect to FIG. 3, migration manager 210 can receive a request to partition service 202 and can create one or more partitions based on the request and migrate data to those partitions accordingly, without requiring any of resources 114 to be taken offline or stop sending messages to service 202. In various embodiments, migration manager 210 can include a migration script that is configured to create resources associated with a new partition for service 202, and is configured to migrate data between the partitions, as discussed further below.

Figure 3:
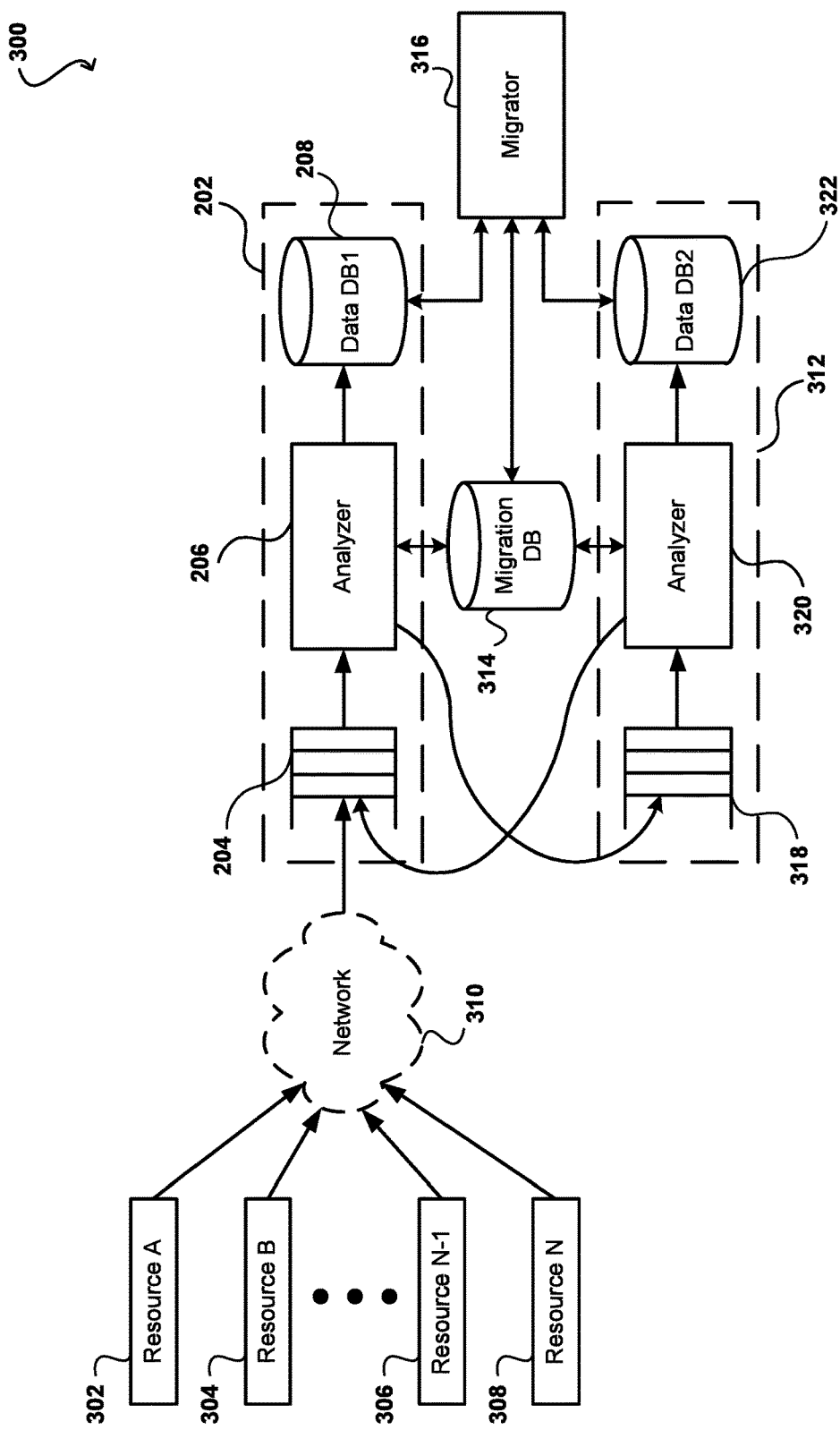
FIG. 3 illustrates an example environment in which a service is being partitioned and data is being migrated, in accordance with various embodiments.

FIG. 3 illustrates an example environment 300 in which a service is being partitioned and data is being migrated, in accordance with various embodiments. It should be understood that reference numbers for similar elements may be carried over between figures for simplicity of explanation but such usage should not be interpreted as a limitation on the various embodiments unless otherwise specifically stated. As shown in FIG. 3, resources, including Resource A 302, Resource B 304, Resource N−1 306, and Resource N 308 can send messages to service 202. In various embodiments, the resources may communicate with service 202 directly or over an appropriate network 310, such as discussed above with respect to FIG. 2. For simplicity of description, resource provider environment 106 is not shown in FIG. 3, however as discussed above, service 202 and resources 302-308 can be provided in the same resource provider environment or in different environments.

As discussed above, a request can be received by a migration manager to partition service 202. The embodiment shown in FIG. 3 shows an intermediate step in the partitioning of service 202. As shown in FIG. 3, a new partitioned service 312, a migration database 314, and a migrator 316 can each be set up. For example, service 312 can be a new instance of service 202 provisioned in resource provider environment 106 or any other appropriate environment. Although the example shown in FIG. 3 illustrates dividing a global partition into two partitions (e.g., an initial partition and a new partition), this is shown for simplicity of explanation, one of ordinary skill in the art would recognize that any number of new partitions could be created using the embodiments disclosed herein. Additionally, although FIG. 3 depicts both partitions within the same resource environment, in some embodiments, the migration manager can create a partition in a new resource environment, such that each partition is provided by a different resource environment.

As shown in FIG. 3, after a migration request is received, at least one migration database 314 and at least one migrator 316 can be provisioned. With the migration database 314 and migrator 316 set up, one or more new partitions can be created, each with its own service 312, including a queue 318, analyzer 320, and data store 322. In some embodiments, the new analyzers 320 can be configured to be authoritative for messages from one or more resources associated with that partition. Similarly, in some embodiments, the new analyzers 320 can be explicitly set to be not authoritative for messages unknown resources, ensuring that data for resources not configured to send messages to a new partition are sent/continue to be sent to the global partition.

In some embodiments, for each new partition, the migrator can transfer data from the global partition data store 208 to the new partition data store 322. Additionally, either sequentially or simultaneously the resources being moved to the new partition can be configured to send messages to the new partition, where they will be received by queue 318, instead of the global partition. After the data has been migrated and the resource(s) have been reconfigured, the migrator 316 and the migration database 314 can be deprovisioned. In some embodiments, when migration is complete, each analyzer can be updated to no longer check for an authoritative partition, as each resource is now sending messages to the intended partition.

In some embodiments, migrator 316 can migrate data associated with a resource from a data store on one partition to a data store on a second partition. Although embodiments are described herein with reference to a global or centralized partition and a regional partition, similar techniques may be used to partition any partition, not just a global or centralized partition. Migrator 316 can receive an instruction from migration manager 210 to migrate data associated with a resource to a new partition. The instruction can identify the resource and the new partition using a resource identifier and partition identifier, respectively. Migrator 316 can set an authoritative partition for messages from the resource in the migration database 314 to the global partition. To ensure no data loss, the data can be migrated in two phases. First, for all of the resource's data in the data store 208 that cannot be modified by incoming messages, the data can be copied to the new data store 322. Second, for data that may be modified by incoming message, the data can be locked in data store 208 and in new data store 322. The remaining resource data can then be copied from the global data store 208 to the new partition data store 322. After all data has been migrated, migrator 316 can update migration database 314 to change the authoritative partition from the global partition to the new partition. The data may then be unlocked in both data store 208 and data store 322. In some embodiments, the resource's data in the global data store 208 can be deleted once its data is migrated. Alternatively, the data may be retained for backup purposes or deleted later.

As discussed, when migrator 316 moves resource data from the first data store 208 to the second data store 322, the migrator can update the migration status of the data. In some embodiments, the migration status of this data can be maintained in migration database 314. Migrator 316 can update migration database 314 when migration of preexisting data is complete for a resource or for multiple resources. The migration status for a given resource can also indicate which partition is 'authoritative' for messages from a particular resource. In some embodiments, migration database 314 can include a table that maps a resource identifier associated with each resource 302-308 to an authoritative partition. In some embodiments, migration database 314 can include additional columns or tables to track migration status, URIs or addresses associated with different analyzers, an indication of whether the resource has been reconfigured to use the new partition, or other data or metrics. Although a migration database 314 including a table is described, any data store and associated data structure may be used to track a migration status and related data for a resource.

In addition to migrating a resource's stored data, the embodiment of FIG. 3 can also redirect live data as it is received during the migration process. This enables migration to occur without data loss or without requiring resources to be taken offline during migration. In some embodiments, each analyzer 206, 320 can be configured to send data to any other analyzer. By forwarding messages between analyzers, the loss of messages during the migration process is prevented. In some embodiments, each analyzer can check migration database 314 before processing an incoming message to determine which analyzer is authoritative for that message. For example, if a message is received by analyzer 206 and it determines that analyzer 320 is authoritative for the message, analyzer 206 can forward the message to queue 318 to be processed by analyzer 320. In some embodiments, analyzer 206 can determine whether it is authoritative for the message by determining a resource associated with the message (e.g., the resource that sent the message). If analyzer 206 is authoritative for the resource associated with the message, then the analyzer can be determined to be authoritative for the message.

In various embodiments, forwarding messages between analyzers using the migration status stored in migration database 314 provides a number of benefits. For example, as discussed, queues 204 and 318 can be actual queues or may represent implicit queues that result from network transit delays. As such, the analyzer a message is initially sent to may be authoritative at the time the message is sent, but may no longer be authoritative once the message is processed by analyzer 206, 320. Forwarding additionally enables messages to reach their authoritative analyzer when changes occur while messages are in transit, further reducing the chance of lost data during migration.

Additionally, by forwarding messages between analyzers, the migration of live data is decoupled from the migration of stored data. As shown in FIG. 3, when a new partition is initially set up, the resources 302-308 still send their data to the global partition. The resources can be reconfigured to send messages to the new partition after the new partition is set up. In some embodiments, this reconfiguration can be performed independently of the migration of the resource's data. For example, if a resource's configuration is updated before the migrator 316 makes the new partition authoritative for messages from that resource, the new partition will forward messages to the global partition. If a new partition becomes authoritative for messages from a resource before the resource's configuration is updated, the resource will continue to send messages to the global partition. The analyzer 206 can receive the message and determine that it is not authoritative using migration database 314. Analyzer 206 will then forward the message to queue 318 to be processed by analyzer 320.

As discussed, when a message is received by an analyzer, the analyzer can determine a resource associated with the message. In some embodiments, the message can include a resource identifier corresponding to the resource that sent the message. The analyzer can retrieve the migration status of the resource from migration database 314 using the resource identifier. The migration status can indicate which analyzer is authoritative. For example, analyzer 206 can receive a message and determine a resource identifier associated with the message. Analyzer 206 can query migration database 314 using the resource identifier to determine whether analyzer 206 is authoritative for the message. If analyzer 206 is authoritative, the analyzer can process the message and store message data in data store 208.

However, if analyzer 206 determines that it is not authoritative for the message, it can identify the authoritative analyzer. For example, the migration status stored in migration database 314 associated with the resource can indicate the authoritative analyzer, such as analyzer 320. In some embodiments, the migration status may include an address or URI associated with the authoritative analyzer. Analyzer 206 can forward the message to authoritative analyzer 320 for further processing. In some embodiments, if no analyzer is indicated as authoritative, the message can be forwarded to a global partition, or other default partition. In some embodiments, if no analyzer is indicated as authoritative for the message, analyzer 206 can attempt to lock the resource's data in data store 208. If the resource's data exists and is already locked, then the message can be returned to the queue so it may be retried. If the data is not locked, then the data can be locked and the message can be processed and the message data stored in data store 208. The resource's data may then be unlocked.

As discussed, once migration is complete resources 302-308 can be updated with new configuration data. For example, configuration data updating the address to which messages are to be sent (e.g., from an address associated with service 202 to an address associated with service 312) can be pushed to the resources after migration is complete. In some embodiments, resources may be configured to periodically check whether a configuration update is available. In some embodiments, when an analyzer determines that it is not authoritative for a message, the analyzer can forward the message to the authoritative analyzer and can return updated configuration data to the resource associated with the message. In various embodiments, configuration data can be updated for a resource as soon as the new partition is set up or can be extended indefinitely.

In various embodiments, this may be repeated as needed to set up additional partitions, either by further dividing the global partition, or subdividing a partition setup using this process. In some embodiments, partitions can be merged using a similar process. For example, if a first partition is to be merged with a second partition (thus removing the second partition), then the second partition can be designated 'global' and the first partition into which the second partition is being merged can be designated 'new'. Data from the second partition (e.g., the "global partition" in this example) is then transferred to the first partition by a migrator, and the migration database updates the first partition to be the authoritative partition for messages from any resources that were previously assigned to the second partition. Once the data migration is complete, the resources can be reconfigured to send messages to the first partition, completing the merger.

In some embodiments, resource data in data stores 208 and 322 can be queried by other services. During migration, query access may be maintained by using the migration database 314 to determine the authoritative partition for the queried data. In some embodiments, a query manager may be provided that interfaces with the migration database 314 and serves as a query endpoint for all of the partitions. The query manager can identify the authoritative partition and direct the query to the appropriate data store. In some embodiments, each partition may include a query manager. The former query endpoint may be replaced with a global query manager or other updated endpoint that uses the migration database 314 to determine which partition is authoritative for each request. The global query manager can then forward the request to the authoritative partition's query manager. Using either approach, query endpoints can be partitioned asynchronously with the partitioning of the data, enabling clients of the query endpoint(s) to be updated based on the partitioning.

Figure 4:
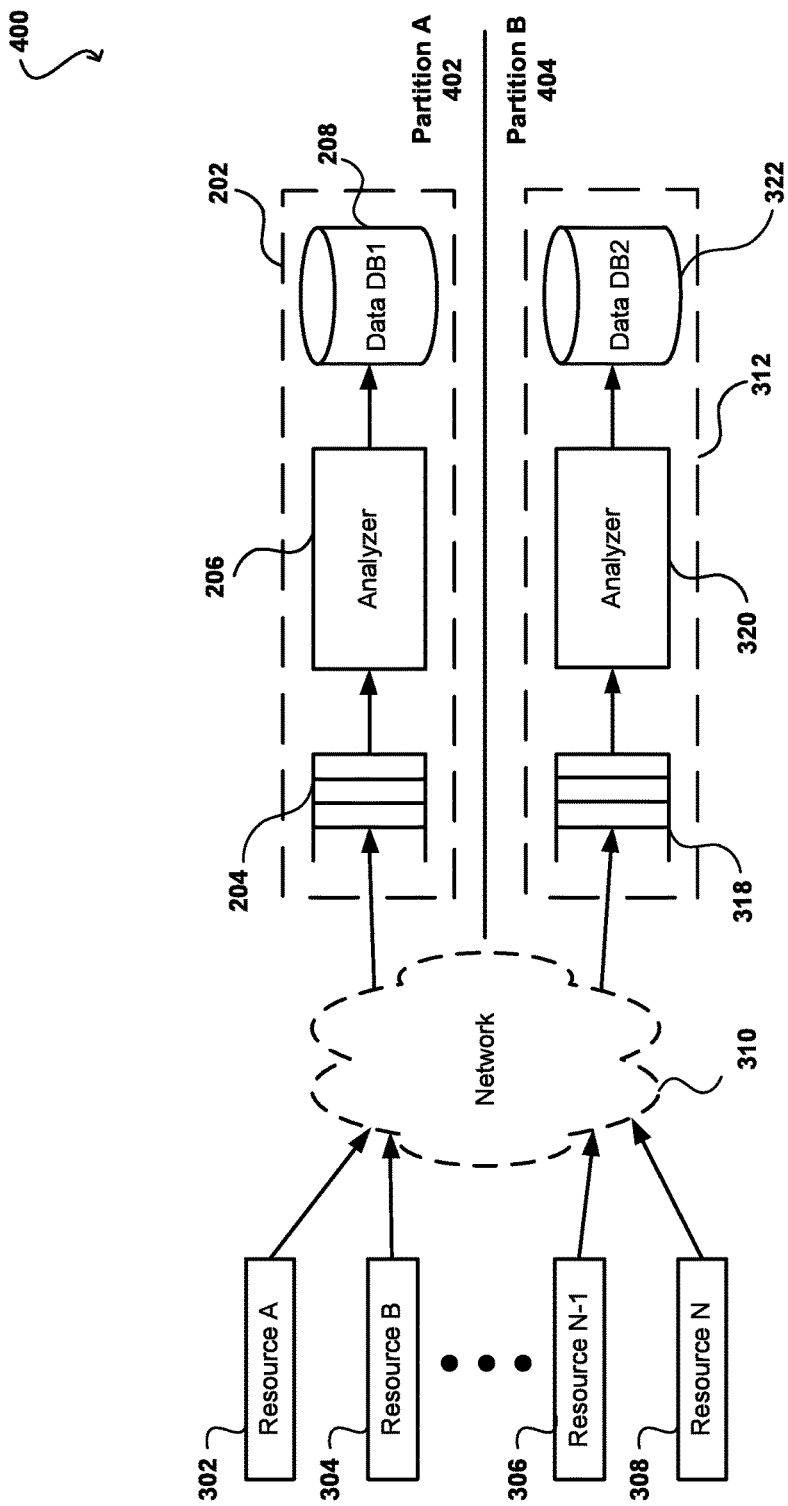
FIG. 4 illustrates an example environment in which a service has been partitioned and data has been migrated, in accordance with various embodiments.

FIG. 4 illustrates an example environment 400 in which a service has been partitioned and data has been migrated, in accordance with various embodiments. As shown in FIG. 4, with the migration complete, the migrator and migration database of FIG. 3 can be deprovisioned, leaving partition A 402 and partition B 404 to manage their respective resources. As shown, Resources A and B 302, 304 are now configured to send messages to service 202 on partition A 402 and Resources N−1 and N 306, 308 are now configured to send messages to service 312 on partition B 404. Although two partitions are shown in FIG. 4, more than two partitions may also be created in various embodiments of the present invention. Each partition may be associated with different resources based on characteristics of those resources. For example, partitions may be set up for different geographic regions. In such an example, resource A 302 and resource B 304 may represent data centers in a first geographic area and resource N−1 306 and resource N may represent data centers in a second geographic area. In some embodiments, partitions may be associated with resources based on other characteristics. For example, one resource may be assigned a dedicated partition based on the type of resource and/or the type or content of data being received from that resource. Other resource to partition assignments may similarly be used in accordance with various embodiments.

Figure 5:
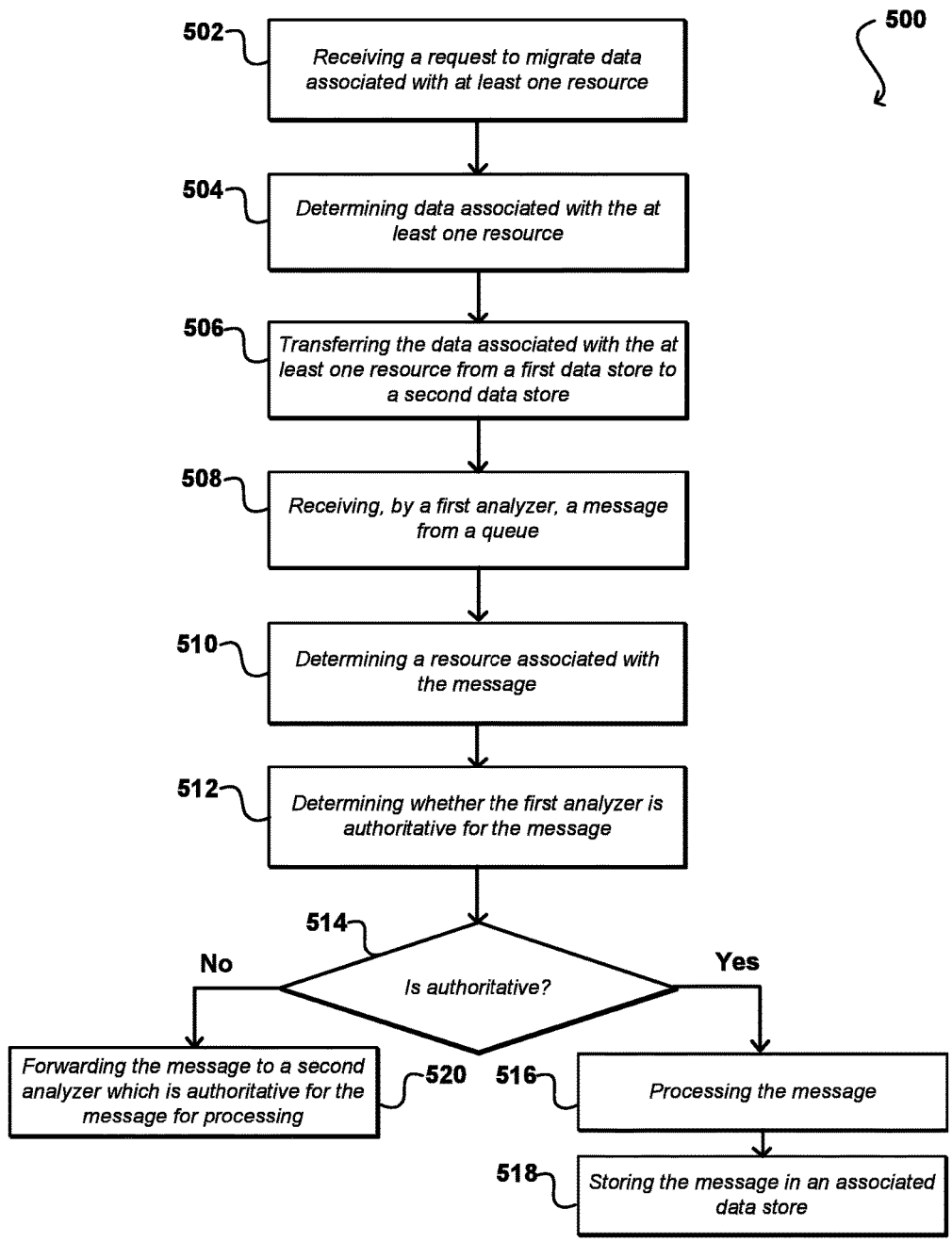
FIG. 5 illustrates an example process for migrating data and partitioning a service that can be utilized in accordance with various embodiments.

FIG. 5 illustrates an example process 500 for migrating data and partitioning a service that can be utilized in accordance with various embodiments. As shown in FIG. 5, a migration manager can receive 502 a request to migrate data associated with at least one resource. As discussed, the migration manager can receive the request from a client device, an administrative computer, or other system or service. In some embodiments, the request can be received through an interface, such as a web-based interface, provided by a resource provider environment or other environment. As discussed, the data can include log data, telemetry data, or other data used to monitor one or more resources, such as application servers, database servers, or other resources. In some embodiments, the request to migrate data can include a request to partition the service, the request identifying a plurality of partitions to be created and assigning one or more resources to each partition.

Data associated with the at least one resource can be identified 504. The data can be transferred 506 from a first data store to a second data store. As discussed, the first data store can be associated with a service, such as a monitoring service, that is being partitioned. A second instance of the service can be started including the second data store, and the data can be transferred from the first data store to the second data store. In various embodiments, the first data store and second data store can be the same type of data store, such as a database, object storage system, or other data store. In some embodiments, the first and second data stores can be different types of data stores and may be identified in the migration request. After the data is transferred, it can be determined that the data associated with the at least one resource is migrated and a migration status associated with the at least one resource can be updated. As discussed, the migration status can include a data structure that indicates one or more of whether the data associated with a resource has been migrated, an identifier associated with the second data store, whether a configuration update has been pushed to the resource, or any other data associated with the migration. The migration status may be stored in a migration database or other data store or memory.

As discussed, stored data can be migrated while live data is redirected, enabling migration to occur without incurring data loss or requiring service down time. During migration, messages may continue to be received from the resources and added to a queue. A first analyzer can receive 508 a message from the queue. The first analyzer can determine 510 a resource associated with the message. The first analyzer can determine a migration status associated with the resource. For example, the first analyzer can request the migration status associated with the resource from the migration database. Based on the migration status, the first analyzer can determine 512 whether it is authoritative for the message. In various embodiments, the first analyzer can be authoritative for the message if the resource that sent the message is assigned to the partition or instance of the migration service associated with the first analyzer.

If the first analyzer is authoritative 514 then the message can be processed 516 (e.g., data can be extracted from the message) and the data, or the entire message, can be stored 518 in the first database. If the first analyzer is not authoritative 514, the first analyzer can determine a second analyzer that is authoritative for the message and forward 520 the message to the second analyzer. In some embodiments, when the message is forwarded to the second analyzer, the first analyzer can push updated configuration data identifying the second analyzer to the resource associated with the message. The configuration data can enable the resource to send future messages directly to the second analyzer. The configuration data can include an address associated with the second analyzer and/or may include credential data required to send messages to the second analyzer.

In some embodiments, each partition can be associated with different resources. The resources associated with a particular partition can be determined based on various characteristics of the resource. For example, one partition may be associated with servers located in a first geographic region, and a second partition may be associated with servers located in a second geographic region. Additionally, or alternatively, the request to partition may identify which resources are to be associated with which partition.

Although embodiments have been described in which data specific to each resource is migrated, in some embodiments, the initial data store may be replicated across all partitions. After it is confirmed that the data store has been replicated to a second data store, the data associated with resources that are not assigned to the second partition can be identified and deleted.

As discussed, if a message is received from a resource not assigned to that partition, the message can be forwarded to the resource's assigned partition. In some embodiments, a response can be returned to the resource indicating that the message was sent to the wrong partition. The resource can then request updated configuration data and resend the message. In some embodiments, the response can include the updated configuration data for the resource.

In some embodiments, if a resource begins sending messages to a new partition before the data associated with that resource has finished migrating, portions of data may end up spread across multiple partitions. In such embodiments, the service can be temporarily suspended and a prioritized migration of the remainder of the data for the resource can be performed.

Figure 6:
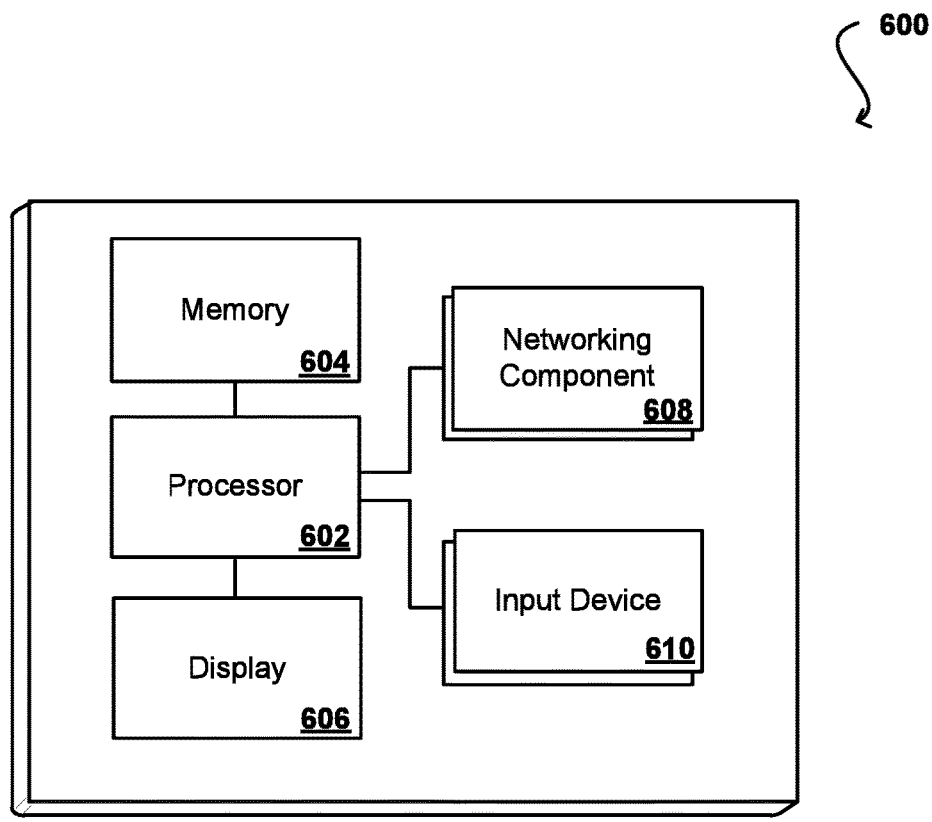
FIG. 6 illustrates example components of a computing device that can be used to implement aspects of various embodiments.

FIG. 6 illustrates a set of basic components of an example computing device 600 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving a request to migrate log data associated with a first server;
identifying the log data associated with the first server;
transferring the log data associated with the first server from a first database associated with a first instance of a monitoring service to a second database associated with a second instance of a monitoring service, the first database being different than the second database;
determining the log data associated with the first server is migrated;
updating a first migration status associated with the first server while the first server remains online;
receiving, by a first analyzer associated with the first instance of the monitoring service, a message from a queue;
determining, by the first analyzer, a second server associated with the message;
determining a second migration status associated with the second server;
based on the second migration status, determining whether the first analyzer is authoritative for the second server;
if the first analyzer is not authoritative:
determining a second analyzer that is authoritative for the second server; and
forwarding the message to the second analyzer for storage in the second database; and if the first analyzer is authoritative, store the message in the first database.

2. The computer-implemented method of claim 1, wherein receiving a request to migrate log data associated with a first server further comprises:
receiving a request to partition the monitoring service, the request identifying at least one partition to be created and assigning one or more servers to each partition, wherein the first server and the second server are the same server.

3. The computer-implemented method of claim 2, wherein the first instance of the monitoring service is on a first partition, the first instance of the monitoring service associated with servers located in a first geographic region, and wherein the second instance of the monitoring service is on a second partition, the second instance of the monitoring service associated with servers located in a second geographic region.

4. The computer-implemented method of claim 1, wherein forwarding the message to the second analyzer further comprises:
pushing updated configuration data identifying the second analyzer to the second server associated with the message.

5. A computer-implemented method, comprising:
maintaining a migration status associated with each of a plurality of resources, the migration status establishing a traffic flow by defining an authoritative analyzer for each of the plurality of resources;
receiving, by a first analyzer, a message from a resource of the plurality of resources, the message including an identifier corresponding to the resource;
determining, by the first analyzer, the resource associated with the message, based at least in part on the identifier;
determining the migration status associated with the resource, based at least in part on the identifier and the defined authoritative analyzer;
based at least in part on the migration status, determining the first analyzer is not authoritative for the message;
determining a second analyzer that is authoritative for the message, based at least in part on at least one of the migration status or the identifier; and
forwarding the message to the second analyzer.

6. The computer-implemented method of claim 5, further comprising:
receiving, by the first analyzer, a second message from a second resource;
determining the migration status associated with the second resource;
based on the migration status associated with the second resource, determining the first analyzer is authoritative for the second resource; and
storing at least a content of the message in a data store associated with the first analyzer.

7. The computer-implemented method of claim 5, further comprising:
receiving a request to migrate data associated with at least one resource;
transferring the data associated with the at least one resource from a first data store associated with a first instance of a service to a second data store associated with a second instance of a service; and
updating a migration status for the at least one resource in a migration data store.

8. The computer-implemented method of claim 7, wherein receiving a request to migrate data associated with at least one resource further comprises:

receiving a request to partition the monitoring service, the request identifying at least one partition to be created and assigning one or more resource to each partition.

9. The computer-implemented method of claim 8, wherein the first instance of the service is on a first partition, the first instance of the service associated with a first subset of resources, and wherein the second instance of the service is on a second partition, the second instance of the service associated with a second subset of resources.

10. The computer-implemented method of claim 7, further comprising:
determining the migration status for each of the at least one resource is complete;
pushing updated configuration data to each of the at least one resource, the updated configuration data indicating an instance of the service assigned to each of the at least one resource.

11. The computer-implemented method of claim 5, wherein receiving, by a first analyzer, a message from a resource, further comprises:
receiving a plurality of messages from a plurality of resources;
adding the plurality of messages to a queue;
retrieving the message from the queue.

12. The computer-implemented method of claim 5, wherein forwarding the message to the second analyzer further comprises:
pushing updated configuration data identifying the second analyzer to the resource associated with the message.

13. A system, comprising:
at least one processor; and
memory including instructions that, when executed by the at least one processor, enable the system to:
maintain a migration status associated with each of a plurality of resources, the migration status establishing a traffic flow by defining an authoritative analyzer for each of the plurality of resources;
receive, by a first analyzer, a message from a resource of the plurality of resources, the message including an identifier corresponding to the resource;
determine, by the first analyzer, the resource associated with the message, based at least in part on the identifier;
determine the migration status associated with the resource, based at least in part on the identifier and the defined authoritative analyzer;
based at least in part on the migration status, determine the first analyzer is not authoritative for the message;
determine a second analyzer that is authoritative for the message, based at least in part on at least one of the migration status or the identifier; and
forward the message to the second analyzer.

14. The system of claim 13, wherein the memory further includes instructions that, when executed by the at least one processor, enable the system to:
receive, by the first analyzer, a second message from a second resource;
determine the migration status associated with the second resource;
based on the migration status associated with the second resource, determine the first analyzer is authoritative for the second resource; and
store at least a content of the message in a data store associated with the first analyzer.

15. The system of claim 13, wherein the memory further includes instructions that, when executed by the at least one processor, enable the system to:

receive a request to migrate data associated with at least one resource;

transfer the data associated with the at least one resource from a first data store associated with a first instance of a service to a second data store associated with a second instance of a service; and update a migration status for the at least one resource in a migration data store.

16. The system of claim 15, wherein the instruction to receive a request to migrate data associated with at least one resource, further enables the system to:

receive a request to partition the monitoring service, the request identifying at least one partition to be created and assigning one or more resources to each partition.

17. The system of claim 16, wherein the first instance of the service is on a first partition, the first instance of the service associated with a first subset of resources, and wherein the second instance of the service is on a second partition, the second instance of the service associated with a second subset of resources.

18. The system of claim 15, wherein the memory further includes instructions that, when executed by the at least one processor, enable the system to:

determine the migration status for each of the at least one resource is complete;

push updated configuration data to each of the at least one resource, the updated configuration data indicating an instance of the service assigned to each of the at least one resource.

19. The system of claim 13, wherein the instruction to receive, by a first analyzer, a message from a resource, further enables the system to:

receive a plurality of messages from a plurality of resources;

add the plurality of messages to a queue;

retrieve the message from the queue.

20. The system of claim 13, wherein the instruction to forwarding the message to the second analyzer, further enables the system to:

push updated configuration data identifying the second analyzer to the resource associated with the message.

* * * * *